United States Patent
Schmidt

(10) Patent No.: US 7,022,356 B2
(45) Date of Patent: Apr. 4, 2006

(54) PROTEIN ENHANCED LOW CARBOHYDRATE SNACK FOOD

(75) Inventor: James Carl Schmidt, Grosse Pointe Park, MI (US)

(73) Assignee: RCD Holdings, Inc., Detroit, MI (US)

(*) Notice: Subject to any disclaimer, the term of this patent is extended or adjusted under 35 U.S.C. 154(b) by 57 days.

(21) Appl. No.: 10/666,608

(22) Filed: Sep. 18, 2003

(65) Prior Publication Data
US 2004/0228951 A1  Nov. 18, 2004

Related U.S. Application Data

(60) Provisional application No. 60/470,277, filed on May 14, 2003.

(51) Int. Cl.
*A23G 3/00* (2006.01)

(52) U.S. Cl. .................. 426/89; 426/656; 426/659; 426/571; 426/572

(58) Field of Classification Search .................. 426/89, 426/656, 659, 571, 572

See application file for complete search history.

(56) References Cited

U.S. PATENT DOCUMENTS

| | | | |
|---|---|---|---|
| 3,976,800 A | 8/1976 | Deininger et al. | |
| 4,089,987 A * | 5/1978 | Chang | 426/564 |
| 4,296,141 A * | 10/1981 | de Paolis | 426/613 |
| 4,493,853 A * | 1/1985 | Vajda et al. | 426/582 |
| 4,810,516 A | 3/1989 | Kong-Chan | |
| 4,900,566 A | 2/1990 | Howard | |
| 4,911,937 A * | 3/1990 | Crosello et al. | 426/103 |
| 5,389,395 A | 2/1995 | Joseph et al. | |
| 5,464,649 A | 11/1995 | St. John et al. | |
| 5,709,903 A | 1/1998 | St. John et al. | |
| 6,248,375 B1 | 6/2001 | Gilles et al. | |
| 6,387,422 B1 * | 5/2002 | Campbell | 426/103 |
| 6,531,171 B1 | 3/2003 | Armand et al. | |
| 6,740,350 B1 * | 5/2004 | Pfeiffer | 426/572 |

* cited by examiner

*Primary Examiner*—Anthony Weier
(74) *Attorney, Agent, or Firm*—Rader, Fishman & Grauer PLLC

(57) ABSTRACT

Herein described is a high protein, low carbohydrate nougat having at least one sugar substitute, protein material and at least one flavoring. The sugar substitute contains between about 19% to about 46% of the nougat by weight, the protein material contains between about 25% to about 38% of the nougat by weight, and the flavoring contains between about 7% to about 37% of the nougat by weight.

9 Claims, 3 Drawing Sheets

PROTEIN ENHANCED LOW CARBOHYDRATE SNACK FOOD

RELATED APPLICATIONS

The present application claims priority under 35 U.S.C. § 119(e) from the following previously-filed Provisional Patent Application, U.S. application No. 60/470,277, filed May 14, 2003 by James C. Schmidt, entitled "Protein Enhanced Low Carbohydrate Foods," and which is incorporated herein by reference in its entirety.

BACKGROUND

The current candy and confection industry is based upon refined sugar, high-fructose corn syrups, and other sweeteners that cause excessive elevation of blood sugar when eaten. The excessive blood sugar not used by the body is converted to fat as an energy source for later use. High blood sugar resulting from eating sugar-carbohydrate rich candies and confections is believed to promote obesity and diabetes.

There has been a recent trend to use foods low in carbohydrates, especially those high in protein, as part of a diet advocated for many years by diet guru Robert Atkins, M.D., often called the Atkins diet. After decades of medical ridicule, the Atkins diet recently gained some credibility with the release of widely publicized research from Duke University. Dieters in the Atkins-funded study lost an average of 20 pounds in six months and saw improvements in cholesterol and other cardiovascular risk factors.

Many traditional snack foods, however, are not low in carbohydrates and high in protein. Most snack foods contain high amounts of refined sugar. Those snack foods that are low in carbohydrates typically do not have a flavor that is favorable to a dieter's taste, and adding protein to such foods makes it harder to create and maintain a favorable flavor. Thus, it is often difficult for an individual to use snack foods as part of the Atkins diet. The result is that an individual is less likely to follow the diet and obtain the benefits therefrom.

SUMMARY

Herein described is a high protein, low carbohydrate nougat having at least one sugar substitute, protein material, and at least one flavoring. The sugar substitute comprises between about 19% to about 46% of the nougat by weight, the protein material comprises between about 28% to about 38% of the nougat by weight, and the flavoring comprises between about 7% to about 37% of the nougat by weight.

BRIEF DESCRIPTION OF THE DRAWINGS

The products and methods described in the present specification can be understood in light of FIGS. 1–5, in which:

FIGS. 1–5 illustrate specific aspects of the products and processes described in the present specification and constitute a part of the specification. Together with the following description, the Figures demonstrate and explain the principles of the products and processes.

DETAILED DESCRIPTION

Figure 1:
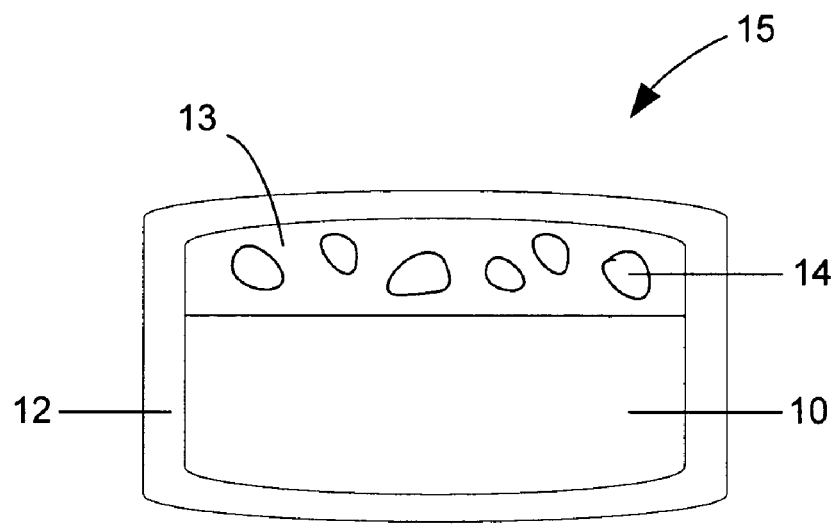
FIG. 1 depicts a cross section of a sheeted and layered snack bar having a high protein, low carbohydrate nougat core.
Figure 2:
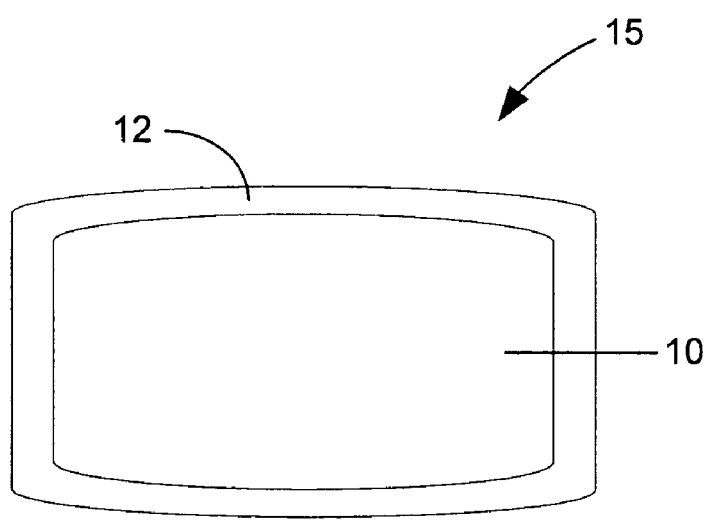
FIG. 2 depicts a cross section of a snack bar having, solid, high protein, low carbohydrate nougat wrapped with a dressing.

The following description provides specific details of embodiments of the present nougat. The skilled artisan will understand, however, that embodiments of the nougat can be practiced without employing these specific details. Indeed, embodiments of the nougat can be practiced by modifying the illustrated methods and resulting products and can be used in conjunction with apparatuses and techniques conventionally used in the industry. Embodiments of the nougat, however, may be adapted for other uses. For example, the nougat may be used for other types of foods than those described below, or may be designed for a diet other than a low carbohydrate, high protein diet.

As used in the present specification and the appended claims, the term "total carbohydrate content" refers to the sum total of all carbohydrates in the food. "Net effective carbohydrates" refers generally to those carbohydrates that have a significant impact on increasing blood sugar levels. Finally, all concentrations referred to by the present specification and appended claims are given in terms of weight percent of the total nougat weight, unless otherwise specified.

The present specification relates to low carbohydrate, protein enhanced foods, such as snack foods and methods for making and using such foods. The snack food includes a high protein, low carbohydrate nougat used in conjunction with sugar-free chocolate, sugar-free caramel, nuts and/or fruits. The specification describes new and unique processes, techniques and formulations for a nougat and a snack food that are healthy and tasty for dieters.

The snack food provides many beneficial results. First, it has increased nutritional value with the addition of plant and animal based proteins. Second, the snack food decreases the amount of carbohydrates compared to typical snack food by reducing or eliminating sugars, starches and grain based flours and products. The snack food also reduces the amount of net effective carbohydrates by adding sugar alcohols or high intensity sweeteners and carbohydrate fibers. One exemplary embodiment of the snack food also contains added minerals and vitamins. Finally, the present snack food provides a flavor that is very favorable to the taste and thus will provide a healthy snack for those on a low carbohydrate diet.

A nougat is a common ingredient in snack foods, such as candy bars, and is generally used to provide a good taste and favorable texture to snack foods. The nougat described herein performs these functions as well as delivers many additional nutritional benefits. First, it reduces the net effective carbohydrate content of the snack food by using sugar substitutes instead of refined sugar. Second, the nougat delivers a healthy dose of protein through the addition of plant and/or animal-based proteins. Finally, the nougat can also supply vitamins, minerals, neutraceuticals, and/or botanicals.

In order to reduce the net effective carbohydrate content in the snack food, refined sugar carbohydrates are replaced by one or more sugar substitutes, which include, but are not limited to, sugar alcohols and high intensity sweeteners.

Refined sugar carbohydrates of traditional snack foods are broken down into glucose and therefore significantly increase blood sugar levels as well as provide high amounts of calories. Sugar substitutes, on the other hand, do not increase blood sugar levels and therefore do not count as net effective carbohydrates.

Sugar alcohols, also known as polyols, can be used as sugar substitutes. Sugar alcohols provide fewer calories (about a half to one-third less calories) than refined sugar because they are converted to glucose more slowly, require little or no insulin to be metabolized, and do not cause sudden increases in blood sugar. Thus, sugar alcohols do not cause the detrimental effects on diabetics that other carbohydrates cause. Examples of sugar alcohols include, but are not limited to, mannitol, sorbitol, xylitol, lactitol, isomalt, maltitol, and hydrogenated starch hydrolysates (HSH).

High intensity sweeteners can also be used as sugar substitutes to reduce the net effective carbohydrate content of food while still providing a sweet taste. These high intensity sweeteners can be used in addition to or in place of sugar alcohols. These sweeteners can be hundreds of times sweeter than sucrose, yet they contain many fewer calories than sucrose. High intensity sweeteners also do not increase blood sugar levels because they are not digested in the small intestine. High intensity sweeteners include, but are not limited to, aspartame, alitame, cyclamates, saccharin, acesulfame, sucralose, neohesperidin dihydrochalcone, stevia sweeteners, glycyrrhizin, thaumatin, and the like, and mixtures thereof.

In one aspect, the nougat delivers a low carbohydrate content by using a sugar alcohol. The sugar alcohol can be present in the nougat in a concentration of about 19% to about 46%. In another aspect, the sugar alcohol comprises from about 25% to about 34%. In one particular aspect, the sugar alcohol used can be maltitol. Maltitol is 75% to 90% as sweet as sucrose and is used in baked goods and ice cream because it gives a creamy texture to foods. However, the nougat can be modified to include other sugar alcohols in order to achieve a sweet flavor with a lower carbohydrate content and a desirable texture.

The sugar alcohol may also be added in the form of a maltitol syrup. Maltitol syrups contain about 50% to about 90% maltitol and are stable against crystallization, thus providing excellent transport and storage properties. In one aspect, the maltitol syrup used is Maltisweet™ 3145, which contains about 75% solids, of which at least about 65% is maltitol. In this aspect, the nougat comprises from about 26% to about 46% Maltisweet™.

In another aspect, a high intensity sweetener can be used to replace sugar and deliver a low carbohydrate nougat. Since these sweeteners can be hundreds of times sweeter than sucrose, only a few drops are needed for every 300 to 600 grams of nougat. In one aspect a high intensity sweetener has a concentration of less than about 1% of the nougat. In a particular aspect sucralose comprises about 0.05%.

Because many sugar substitutes, in particular high intensity sweeteners, do not have the same weight or bulk as refined sugars, a bulking agent may be necessary to provide the desired texture and consistency of the nougat. This can be achieved by adding inulin, oligofructose, or a sugar alcohol to the nougat.

Inulin and oligofructose mimic sugar's viscosity, texture, humectancy, freezing point depression and water binding activity. They have a mild sweetness and can also form a gel with fat-like characteristics that adds creaminess to the product. Using small amounts allows taste and texture of low carbohydrate, low fat products to be improved, thus making them useful as sugar and fat replacements for many food products. Inulin and oligofructose are also good sources of soluble dietary fiber and are well suited for diabetics because they do not increase the blood sugar level or insulin level due to its indigestible nature.

Inulin or oligofructose can be present in the nougat in a concentration of up to about 10% of the weight of the sugar alcohol used in the nougat. Sugar alcohols can also act as bulking agents, and their presence requires less inulin or oligofructose than when only high intensity sweeteners are present. The amount of inulin or oligofructose can be varied, however, depending on the desired consistency and texture of the nougat.

The texture and volume of a nougat may also be changed by whipping the nougat. In one aspect, the nougat is lighter and less dense because it has been whipped or beaten to incorporate air into it. Other methods, besides adding inulin and sugar alcohols or whipping the nougat, may be used to provide the desired textural, bulking, and rheological characteristics of the nougat. For example, maltodextrin or polydextrose can be used. Those skilled in the art will understand that even other additives can be used in the nougat to provide similar dietary and bulking benefits as inulin, oligofructose, and sugar alcohols.

In addition to providing a low carbohydrate nougat, the present specification also describes a nougat with a high protein content. Because a low carbohydrate diet causes the body to burn fat and muscle tissue to obtain needed energy, a dieter should consume greater amounts of protein to prevent losses of muscle tissue. Some of the healthy functions performed by protein include supplying energy and building and repairing muscle tissue.

The protein materials that can be used in the nougat include any protein material that can be used in the processes described below. Examples of such protein materials include, but are not limited to, soy and soy isolates, whey and whey isolates, micro cross filtered whey isolates, hydrolyzed whey proteins, wheat proteins (e.g., glutenir, gliadin, and gluten), isolated grain and vegetable based proteins, egg white protein, protein isolates, other hydrolyzed proteins, and albumen isolates. Vegetable based proteins include any vegetable in which proteins may be collected, whether condensed, accumulated, or isolated. Examples of protein-providing vegetables include spelt, quinoa, amaranth, buckwheat, black rice, and the like.

In one aspect the nougat contains whey protein. Whey protein is available in a number of different types based upon the protein content of the whey source, which can range from about 25% to about 89%. In one aspect of the nougat, whey protein isolate is present in a concentration of about 25% to about 35%. Whey protein isolate is the purest form of whey protein and contains between about 90% and about 95% protein. It contains little (if any) fat or lactose. In another aspect, hydrolyzed whey protein is also present in the nougat in a concentration of about 10% of the whey protein isolate weight. Hydrolyzed whey protein consists of protein chains broken down into smaller segments called peptides. Hydrolyzed whey protein is more easily digested and has a reduced potential for allergic reactions versus non-hydrolyzed whey protein.

Any combination of protein materials may be used in the nougat, not just those described herein. Since each different combination of protein materials yields a different flavor and texture, the blend of protein materials used in the nougat depends on the desired texture, consistency, and flavor.

Other sources of protein that can be used in the nougat include peanut butter and/or nuts. Typically, nuts and nut products contain about 25% protein by weight. In addition to providing protein, peanut butter also adds flavor to the nougat. In one aspect, peanut butter comprises about 7% of the nougat.

The nougat can also act as an ideal carrier for vitamins and minerals. Examples of vitamins that can be added to the nougat include, but are not limited to, vitamin A, vitamin $B_{12}$, vitamin C, vitamin D, vitamin E, vitamin K, para-aminobenzoic acid, Vitamin $B_2$ (riboflavin), Vitamin $B_6$, niacin, inositol, biotin, folic acid, choline, and vitamin $B_1$. Examples of minerals that can be added include, but are not limited to, magnesium, iron, zinc, copper, manganese, sodium, potassium, calcium, selenium, chromium, molybdenum, chlorine, fluorine, phosphorus, sulfur, and iodine. The nougat can also contain botanicals or neutraceuticals including, but not limited to, bilberry, cascara, cat's claw, cayenne, cranberry, devil's claw, dong quai, echinacea, evening primrose oil, feverfew, garlic, ginger, ginkgo, Asian ginseng, Siberian ginseng, goldenseal, gotu kola, grape seed, green tea, hawthorn, kava, licorice, milk thistle, noni, saw palmetto, St. John's wort, valerian, melatonin, damiana, yerbe mate, guarana, and the like.

The nougat may also comprise salts, seasonings, and flavorings (collectively "flavorings") to make the nougat more desirable to the taste. The concentration of flavorings can be adjusted according to need and taste. Generally, the combination of all flavorings constitutes from about 7% to about 37% of the nougat. Examples of flavorings include, but are not limited to, butter, mint, peppermint, spearmint, cinnamon, wintergreen, vanilla, fruit, fruit extracts and essences, nut extracts, peppers, chili pepper, chocolate, caramel, peanut butter, sarsaparilla, sassafras, salt, wild cherry, ginger, nutmeg, honey, malt, grain flavors, paprika, garlic, and other flavorings well known to those of skill in the art.

The flavorings can be added in any proportion or combination to achieve the desired taste. For example, salt and vanilla can comprise any proportion of the total flavoring but generally each comprises less than about 2% of the nougat. In one aspect, concentrated fruit juices and purees along with dried fruit pieces are used in the nougat for flavoring and can comprise up to about 97% of the total flavoring. In another aspect, peanut butter comprises up to about 96% of the total flavoring.

In another aspect the nougat also contains water. Water performs the function of adding moisture to the mixture and helps the ingredients mix completely to form a homogeneous nougat. Water is generally absorbed by the dry ingredients, particularly the proteins. In one aspect, the ratio of water to dry ingredients ranges from about 1:5 to about 1:15. In another aspect, the ratio of water to protein material ranges from about 1:4 to about 1:14.

The nougat can also include soft butter, which in one aspect may be unsalted. Generally, the concentration of butter can be up to about twice that of the water in the nougat. Butter provides fat, texture, and some flavor to the nougat. However, other ingredients can be used instead of butter to provide fat and texture. For example, oils that may be used include, but are not limited to, almond oil, canola oil, chili oil, coconut oil, corn oil, grapeseed oil, hazelnut oil, mustard oil, olive oil, palm oil, peanut oil, safflower oil, sesame oil, sunflower seeds, soybean oil, trans fatty acids, vegetable oil, and walnut oil.

By thus combining sugar substitutes with protein additives and any of the other above ingredients, the nougat herein described allows diabetics and those on the Atkins or another low carbohydrate diet to eat a sweet and satisfying food that aids in weight loss, does not increase blood sugar levels, and that delivers the needed protein to keep tissue strong and healthy.

The present specification also describes snack foods incorporating a high protein, low carbohydrate nougat and a dressing. These snack foods may take on many different shapes and configurations, such as bars, chocolate truffles, and other candies having a nougat. The dressings used in these snack foods add flavor, texture, and eye appeal to the nougat described above. The dressings include, but are not limited to, caramel, chocolate, fruit, nuts, grains and cereals, or any combination thereof, and can be incorporated in the snack food in many different methods.

In one aspect of the snack food, the caramel dressing is sugar-free caramel and comprises maltitol, polydextrose, butter, sodium caseinate, natural flavors, salt, glycerol monostearate, and soya lecithin. Table A shows another aspect of a sugar-free caramel and its composition.

TABLE A

Sugar-free Caramel Composition

| Ingredient | Weight % of Caramel |
| --- | --- |
| Water | 5.00 |
| Maltisweet ™ 3145 | 74.60 |
| Butter (unsalted) | 4.30 |
| Cocoa Butter | 8.50 |
| Vanilla + Caramel | 0.19 |
| Lecithin | 0.25 |
| Salt | 0.25 |
| Dry Milk | 5.00 |
| Purity with Starch | 1.70 |

The sugar-free caramel used in these snack foods contains no refined sugars, but only sugar alcohols and fibers that do not affect blood sugar levels. Thus the sugar-free caramel is also safe for diabetics and low carbohydrate dieters.

Also described in this specification is the use of sugar-free milk chocolate as a dressing for the nougat described above. In one aspect, the sugar-free milk chocolate may include maltitol, chocolate liquor, cocoa butter, sodium caseinate, milk fat, soya lecithin, vanillin, vanilla, and salt. The sugar-free milk chocolate is in no way limited to the above composition. Rather, the sugar-free milk chocolate may be any composition commonly known to those in the art. For example, the above sugar-free milk chocolate may also comprise sucralose. In addition, the chocolate need not be milk chocolate but may also be sweet, semi-sweet, white, or any other type of chocolate.

The snack foods herein described can also include other dressings such as fruits, nuts, grains, cereals, or any combination thereof, to add flavor and eye appeal to the snack food. In one aspect, fruit dressings include dried fruit pieces such as raspberries or cherries. The fruit dressings can also include freeze-dried fruit. The nuts in the snack food can comprise pistachios, almonds, peanuts, or walnuts, although any type of nut may be used as well as any combination of nuts. The nuts may also be roasted and/or salted. In another aspect, the dressings comprise grains or cereals, which include, but are not limited to, sunflower, sprouts, flaxseed, flax, wheat flakes, rice spelt, kamut, quinoa, white sesame, soybeans, barley, millet, oats, rye, and triticale.

The above described dressings can be used in conjunction with the nougat described above in any way, shape, or form. In one aspect of the snack food, the dressings surround or coat a nougat. In another aspect, the dressings are mixed into a nougat. In another aspect, the dressings are layered or sheeted over a nougat layer or sheet. In another aspect, the dressings may be surrounded or covered by a nougat layer. Those skilled in the art will recognize that the principles and products herein described include many other different combinations and configurations of a nougat and dressings including, but not limited to, those described below.

One aspect of the snack food includes a sheeted and layered bar. In this aspect, as shown in FIG. 1, the bar (15) includes a sheeted or layered, high protein, low carbohydrate nougat (10) topped with a sugar-free caramel layer (13). The caramel layer (13) may also contain nuts (14). The nougat (10) and caramel layer (13) are wrapped in a sugar-free chocolate coating (12), wherein the chocolate coating (12) encloses both the nougat (10) and caramel layer (13) on all sides.

Another aspect of the snack food, as shown in FIG. 12, includes a bar (15) that comprises a solid, high protein, low carbohydrate nougat (10) wrapped in a sugar-free chocolate coating (12). In one aspect the nougat (10) may be whipped or lightened to add texture and consistency to the nougat (10). In another aspect, the nougat (10) may also contain a sugar-free caramel layer (not shown).

Figure 3A:
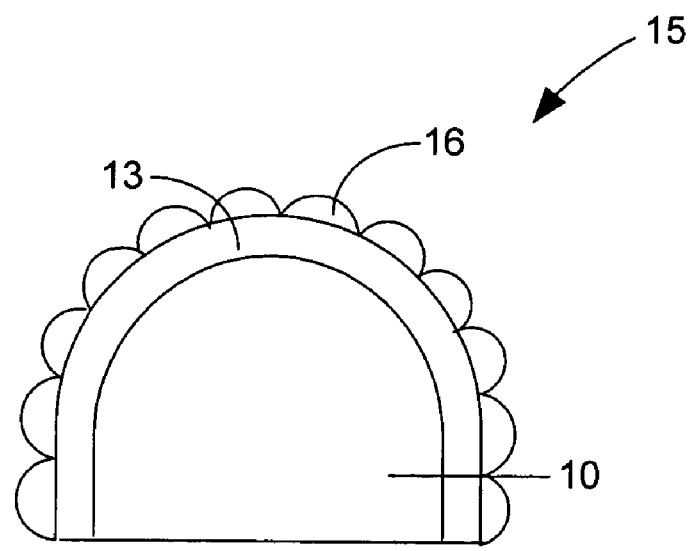
FIGS. 3a and 3b depict cross sections of a snack bar having a high protein, low carbohydrate nougat core that is partially or wholly covered with a dressing.
Figure 3B:
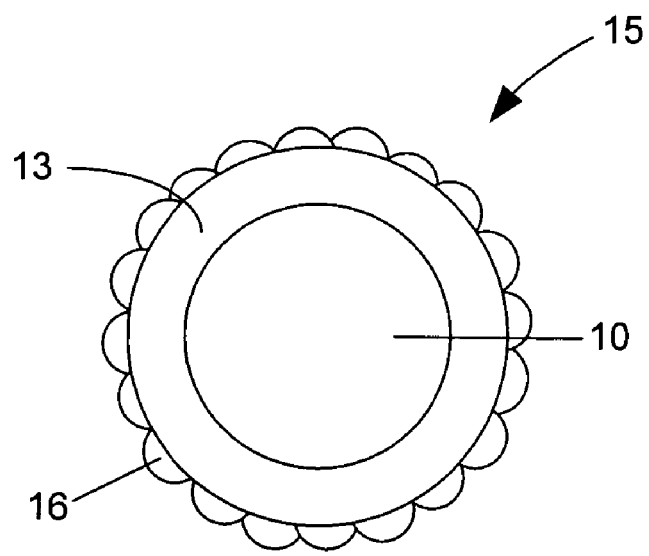

FIGS. 3a and 3b show another aspect in which the snack food includes a bar (15) having an extruded, high protein, low carbohydrate nougat core (10) that is partially or wholly covered or surrounded with a sugar-free caramel layer (13). In one aspect the caramel layer (13) may include dressings (16) such as nuts, fruit pieces, grains, cereals, or any combination thereof. In another aspect, the nougat core (10) may also contain fruit or nut garnishes, or both.

Figure 4:
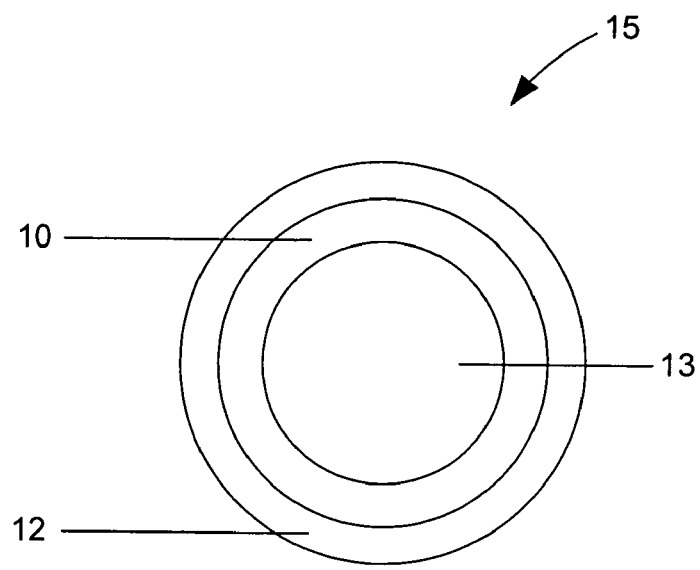
FIG. 4 depicts a snack bar comprising a core wrapped by a high protein, low carbohydrate nougat layer.

Another aspect, shown in FIG. 4, includes a snack bar (15) having a sugar-free caramel core (13) wrapped by a high protein, low carbohydrate nougat layer (10). In this aspect, the nougat layer (10) can also be covered with a sugar-free chocolate coating (12).

Figure 5:
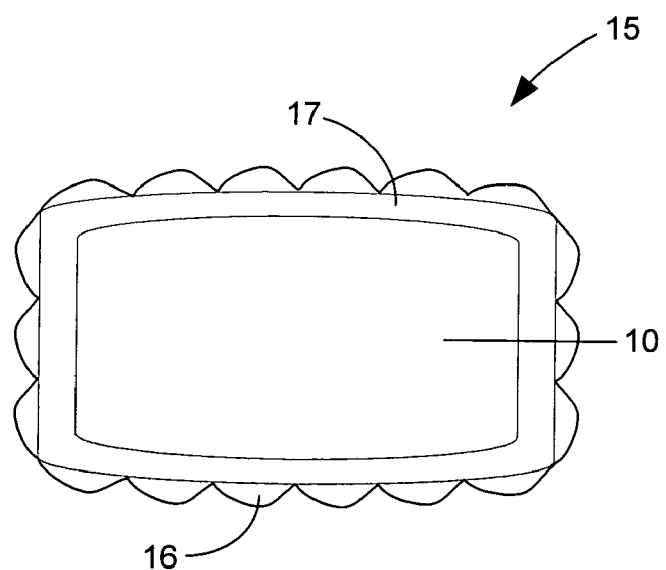
FIG. 5 depicts a snack bar having a coated, high protein, low carbohydrate flavored nougat core.

In another aspect, as shown in FIG. 5, the snack food may include a bar (15) having a fruit flavored, high protein, low carbohydrate nougat core (10), wherein the nougat core (10) is coated with an exterior coating (17) of sugar-free caramel, sugar-free chocolate, or both. The exterior coating (17) may then be covered with dressings (16) such as fruit, nuts, grains, cereals, or any combination thereof. In another aspect, the nougat core (10) may have fruit, nuts, and/or grain pieces. In one aspect of the snack food, the nougat core (10) contains dried cherry pieces and the exterior coating (17) is coated with sunflower and grains.

The snack food described above is not limited to the aspects described in this specification. Further aspects of the snack food include a high protein, low carbohydrate nougat that is sheeted, extruded, formed, wrapped, filled, and/or sandwiched with other dressings. The nougat can also be used in confections and candies such as a low carbohydrate, high protein chocolate truffle. In one aspect, a nougat forms the center of the truffle. In another aspect, a nougat center is covered by sugar-free chocolate. In another aspect, the truffle includes a nougat with other dressings. The snack food also includes a high protein, low carbohydrate nougat used in other types of candies and chocolates. Those skilled in the art will understand in what ways the nougat can be used in other confections, truffles, and candies.

This specification also describes exemplary methods for making a high protein, low carbohydrate nougat. The first exemplary method comprises the following steps: (1) making a flavoring syrup; (2) allowing the flavoring syrup to cool; (3) combining the cooked flavoring syrup with a substitute sweetener, flavoring(s), butter, and inulin and mixing; and (4) mixing in protein.

First, a flavoring syrup is made by combining at least one flavoring and a sugar alcohol or sugar alcohol syrup and bringing to a short boil. Water may also be added to the syrup to aid in mixing. In addition to giving the nougat flavor and sweetness, making a flavoring syrup first also ensures that the flavoring completely and uniformly distributes throughout the nougat mixture. Mixing the flavorings and all other components at once, however, could result in the flavoring not distributing throughout the protein material or throughout the entire mixture. In one aspect, the flavoring comprises fruit flavoring such as fruit essence and/or fruit pieces. The flavor of the nougat need not be fruit flavored, however, but can be any flavor such as vanilla, coconut, or cinnamon. After the flavoring syrup is combined and cooked, it can be allowed to cool. Cooling is beneficial to the flavoring syrup because it decreases its stickiness. In one aspect, the flavoring syrup is allowed to cool to about 60° F. In another aspect, the flavoring syrup is allowed to cool to at least about room temperature.

Once the flavoring syrup is made, it can be used to make a dough. The dough can be made by performing the following steps. First, cooked flavoring syrup, inulin, substitute sweetener and flavorings are combined. Next, butter is added to the mixture while mixing with a whip attachment. When these components are combined, proteins are then added to the mixture and mixed in until the mixture reaches the consistency of dough.

The speed at which the proteins are mixed in affects the ultimate texture of the nougat. Because the proteins form a bonded suspension, they are mixed in on slow speed to ensure complete mixture without degrading their bonding in the suspension thereby maintaining the proteins adequately dispersed throughout the nougat mixture. Mixing the proteins on high speed increases the stickiness of the mixture and degrades the bonding of the proteins, thereby degrading the texture and protein distribution of the nougat mixture.

The second exemplary method of making the nougat comprises: (1) making a cream by mixing together water, flavoring material, sugar alcohol, substitute sweetener, soft butter, vanilla and/or other flavorings, and salt; and (2) mixing in protein material on slow speed until it reaches the consistency of dough.

In this exemplary method, a fruit syrup is not made first; rather, all components except the proteins are added at once. In one aspect, the flavoring material of the cream is fruit flavoring obtained by using fruit essence and inulin. In one particular aspect, the fruit flavoring comprises raspberry essence. In another aspect, the flavoring material is peanut butter. The cream, however, may have any flavoring material to achieve a desirable flavor. In one aspect, the sugar alcohol used in the cream is maltitol, and in a particular aspect the maltitol is Maltisweet™. The sugar alcohol, however, may be any type of sugar alcohol. In another aspect, the sweetener comprises sucralose, although any sweetener may be used.

By mixing on high speed, the mixture reaches a creamy consistency. The high mixing speed ensures that all ingredients and components are well mixed and combined. The speed of mixing can be adjusted, however, to obtain the desired texture and consistency of the nougat.

The cream is then made into a dough by mixing in proteins on slow speed. Again, the speed at which the proteins are mixed in affects not only the ultimate nougat texture but also the protein bonding characteristics. Slow speed mixing maintains the proteins in a bonded suspension and also decreases the stickiness of the mixture.

In both exemplary methods described above, once the mixture reaches the consistency of dough, crystalline maltitol may be added in order to dry the mixture. The mixture may also be dried by mixing additional proteins such as whey, soy, or wheat proteins. Drying is beneficial because it improves the palatability and textural properties of the nougat. The amount of maltitol or proteins added for dryness depends on the desired dryness of the mixture. Finally, in one aspect, to further enhance the fruit flavoring and eye appeal, fruit garnish can be added to the dough after the proteins are added. One particular aspect of the fruit garnish includes dried raspberry pieces.

This specification also provides a method for making a high protein, low carbohydrate snack bar. The snack bar can have a total carbohydrate content of about 3 to about 17 grams per 35 gram serving, a net effective carbohydrate content of about 1 gram per 35 gram serving, and a protein content of about 6 to about 20 grams per 35 gram serving. In one particular aspect, the protein content is about 6 grams per 35 gram serving. The dressings of the snack food include chocolate, caramel, fruit, nuts, grains and cereals, or any combination thereof. One exemplary method for making a snack bar comprises (1) making a high-protein, low-carbohydrate nougat; (2) forming or shaping the nougat; and (3) dressing the nougat. To make the high-protein, low-carbohydrate nougat, the methods described above may be used.

The nougat of the snack bar can be formed or shaped by either cold forming or hot forming. Cold forming the nougat comprises maintaining the temperature of the nougat at about room temperature or at a temperature at which the nougat remains malleable but can retain its shape without deforming. When the nougat is at this temperature it can be formed and manipulated into any desired shape and size. In one aspect this forming is done by passing the nougat mixture through an extruder that imparts the desired shape to the nougat, thus forming an extruded nougat bar. The extruded nougat bar can then be cut to the desired lengths to create a plurality of smaller nougat bars. Each individual nougat bar can then be enrobed, coated, or layered with various dressings to create a snack bar.

In another aspect, the nougat of the snack bar is formed when the nougat mixture is hot. Hot forming comprises heating the nougat mixture to a temperature between about 140 and about 160° F., or to a temperature where the mixture is molten. In one aspect, the molten nougat is then passed through an extruder that gives the nougat the desired shape. Once formed, the extruded nougat cools to about room temperature. In another aspect, the molten nougat is placed into a mold or a die, after which the nougat is cooled either to about room temperature or until the nougat will no longer deform when removed from the mold. In both aspects of hot forming, after the nougat is cooled it maintains its shape and can be enrobed or coated with various dressings.

The products and methods herein described can be better understood with a description of the following examples. It should be noted, however, that the following examples are to serve only as examples and should in no way provide limitations to the products and methods described herein.

EXAMPLE 1

An exemplary high protein, low carbohydrate snack bar was produced, having a high protein, low carbohydrate nougat core coated with sugar-free caramel and dry roasted peanuts. A nougat batch was first prepared, having a total weight of about 545.9 grams, from the following composition:

TABLE 1a

| Ingredient | Weight % of Nougat |
| --- | --- |
| Fruit Essence/Syrup Concentrate | 10.4 |
| Maltisweet ™ 3145 | 26.0 |
| Inulin | 2.6 |
| Sucralose | <1 |
| Butter (unsalted) | 5.2 |
| Vanilla/Flavoring | 1.3 |
| Dried Fruit | 25.3 |
| Salt | <1 |
| Whey Protein Isolate | 25.7 |
| Hydrolized Whey | 2.6 |
| Crystalline Maltitol | <1 |

The fruit essence, Maltisweet™ 3145 and dried fruit pieces illustrated in Table 1a were combined in a mixer and then mixed to form a fruit syrup. The mixture was then brought to a short boil to sterilize the mixture. After the short boil, the mixture was removed from heat and allowed to cool to about 60° F. The cooled fruit syrup was then combined in a mixer with liquid inulin, sucralose, butter, vanilla, and salt, and mixed with a whip attachment until all ingredients were combined well. Whey protein and hydrolyzed whey protein were then added to the mixture and mixed in on slow speed until the mixture reached the consistency of dough. Finally, crystalline maltitol was added to dry the mixture to the desired consistency and texture.

The nougat batch was then formed into 32 bars by hot forming. This was done by first heating the nougat mixture to between about 140° F. and about 160° F. The molten nougat was then placed into an extruder that shaped the nougat mixture into 32 nougat bars. After cooling to about room temperature, each formed nougat bar, weighing about 17.1 grams, was then coated with about 7.1 grams of the sugar-free caramel of Table A and garnished with about 12.4 grams of dry roasted peanuts. The nougat batch thus produced 32 snack bars of about 36.5 grams each. A summary of the protein and sugar alcohol content of the bars thus produced is given in Table 1b.

TABLE 1b

| Ingredient | Total Weight (g) | | Protein Weight (g) | | Sugar Alcohol Weight (g) | |
| --- | --- | --- | --- | --- | --- | --- |
| | Batch | Bar | Batch | Bar | Batch | Bar |
| Nougat | 545.9 | 17.1 | 154.4 | 4.8 | 110.4 | 3.4 |
| Sugar-free Caramel | 226.8 | 7.1 | 0 | 0 | 126.9 | 4.0 |
| Dry Roasted Peanuts | 396.9 | 12.4 | 99.2 | 3.1 | 0 | 0 |
| Total | 1169.6 | 36.5 | 226.8 | 7.9 | 237.3 | 7.4 |

EXAMPLE 2

A second exemplary high protein, low carbohydrate snack bar was also produced by first preparing a nougat batch, having a total weight of about 495.0 grams, from the composition illustrated in Table 2a.

TABLE 2a

| Ingredient | Weight % of Nougat |
|---|---|
| Water | 2.9 |
| Fruit Essence | 2.9 |
| Maltisweet ™ | 33.8 |
| Inulin | 3.4 |
| Sucralose | <1 |
| Butter (unsalted) | 5.7 |
| Vanilla/Flavoring | 1.6 |
| Dried Fruit | 11.7 |
| Salt | <1 |
| Whey Protein Isolate | 34.4 |
| Hydrolized Whey | 3.4 |

The nougat batch was formed by first combining water, fruit essence, Maltisweet™ 3145, sucralose, butter, vanilla, and salt in a mixer and mixing with a whip attachment until the mixture was creamy. Whey protein and hydrolyzed whey protein were then added and mixed in on slow speed. When the mixture reached the consistency of dough, the dried fruit pieces were added. After the fruit garnish was mixed in, the nougat mixture was removed from the mixer and placed in an extruder.

When placed in the extruder for hot forming, the nougat mixture had a temperature between about 100° F. and about 140° F. The nougat mixture was then placed in an extruder and hot formed into 30 nougat bars, each having a weight of about 16.5 grams. After cooling, each nougat bar was then coated with about 7.6 grams of sugar-free caramel having the composition of Table A and then dressed with about 11.3 grams of dry roasted peanuts. The nougat batch thus produced 30 snack bars of about 35.4 grams each. A summary of the protein and sugar alcohol content of the bars thus produced is given in Table 2b.

TABLE 2b

| | Total Weight (g) | | Protein Weight (g) | | Sugar Alcohol Weight (g) | |
|---|---|---|---|---|---|---|
| Ingredient | Batch | Bar | Batch | Bar | Batch | Bar |
| Nougat | 495.0 | 16.5 | 187.1 | 6.2 | 125.4 | 4.2 |
| Sugar-free Caramel | 226.8 | 7.6 | 0 | 0 | 126.9 | 4.2 |
| Dry Roasted Peanuts | 340.2 | 11.3 | 85.1 | 2.8 | 0 | 0 |
| Total | 1062.0 | 35.4 | 272.2 | 9.1 | 252.3 | 8.4 |

EXAMPLE 3

A third exemplary high protein, low carbohydrate snack bar was produced by first preparing a nougat batch, having a total weight of about 363.5 grams, from the composition listed in Table 3a.

TABLE 3a

| Ingredient | Weight % of Nougat |
|---|---|
| Water | 3.9 |
| Maltisweet ™ 3145 | 46.0 |
| Sucralose | <1 |
| Butter (unsalted) | 7.8 |
| Vanilla | <1 |

TABLE 3a-continued

| Ingredient | Weight % of Nougat |
|---|---|
| Peanut Butter | 6.6 |
| Salt | <1 |
| Whey Protein Isolate | 35.1 |

First, water, Maltisweet™ 3145, sucralose, butter, vanilla, peanut butter, and salt were mixed with a whip attachment in a mixer. When the mixture reached a creamy consistency, whey protein was added and mixed in on slow speed mix. When this mixture reached the consistency of dough, the mixture was removed and placed in an extruder. The nougat was then formed into bars by cold forming. To be cold formed, the nougat mixture was extruded at about room temperature into 24 separate nougat bars. Each nougat bar was then coated with about 14.2 grams of sugar-free caramel, about 8.3 grams of dry roasted peanuts, and about 18.9 grams of sugar-free milk chocolate. The nougat batch thus produced 24 snack bars of about 56.5 grams each. A summary of the protein content of the bars thus produced is given in Table 3b.

TABLE 3b

| | Total Weight (g) | | Protein Weight (g) | |
|---|---|---|---|---|
| Ingredient | Batch | Bar | Batch | Bar |
| Nougat | 363.5 | 15.1 | 127.6 | 5.3 |
| Sugar-free Caramel | 340.2 | 14.2 | 0 | 0 |
| Sugar-free Chocolate | 453.6 | 18.9 | 0 | 0 |
| Dry Roasted Peanuts | 198.5 | 8.3 | 49.6 | 2.1 |
| Total | 1355.8 | 56.5 | 177.2 | 7.4 |

EXAMPLE 4

For purposes of comparison, the nutritional composition of a conventional snack bar having a nougat is shown below in Table 4. A Snickers® candy bar, which includes a nougat, peanuts, caramel, and a chocolate coating, was used to obtain the nutritional data.

TABLE 4

| | Weight (g) per 35 Gram Bar Serving |
|---|---|
| Protein | 2 |
| Carbohydrates | 21 |
| Sugar Alcohol | 0 |
| Fiber | 1 |
| Net Effective Carbohydrates | 20 |

The preceding description has been presented only to illustrate and describe exemplary embodiments of the present snack food. It is not intended to be exhaustive or to limit the products and processes to any precise form disclosed. Many modifications and variations are possible in light of the above teaching. It is intended that the scope of the products and processes be defined by the following claims.

What is claimed is:

1. A high protein, low carbohydrate nougat comprising:
   at least one sugar substitute;
   a protein material; and
   at least one flavoring;
   wherein said at least one sugar substitute comprises between about 19% to about 46% of a nougat by weight, said protein material comprises between about 28% to about 38% of said nougat by weight wherein said protein material is dispersed throughout said nougat, said nougat having a texture, and wherein the bonding characteristics of said protein material do not degrade the texture of said nougat, and said at least one flavoring comprises between about 7% to about 37% of said nougat by weight.

2. The nougat of claim 1, wherein said at least one sugar substitute comprises a sugar alcohol.

3. The nougat of claim 2, wherein said sugar alcohol comprises one of maltitol or a maltitol syrup.

4. The nougat of claim 1, wherein said protein material comprises one of a whey protein, a whey protein isolate, a hydrolyzed whey protein, or a combination thereof.

5. The nougat of claim 1, wherein said flavoring comprises one of a fruit syrup, fruit essence, dried fruit pieces, vanilla, peanut butter, or a combination thereof.

6. The nougat of claim 1, further comprising inulin or oligofructose, wherein said inulin or oligofructose comprises about 10% of the weight of said sugar substitute.

7. A high protein, low carbohydrate nougat, comprising:
   water;
   a sugar alcohol;
   a high intensity sweetener;
   a fat material;
   flavorings; and
   a protein material comprising between about 28% to about 38% of said nougat by weight, wherein said protein material is dispersed throughout said nougat, said nougat having a texture, and wherein the bonding characteristics of said protein material do not degrade the texture of said nougat.

8. The nougat of claim 7, further comprising a bulking agent.

9. A high protein, low carbohydrate nougat, comprising:
   maltitol;
   inulin;
   peanut butter or fruit flavorings; and
   whey protein comprising between about 28% to about 38% of said nougat by weight, wherein said whey protein is dispersed throughout said nougat, said nougat having a texture, and wherein the bonding characteristics of said whey protein do not degrade the texture of said nougat.

* * * * *